United States Patent [19]

Weeks

[11] Patent Number: 4,655,443
[45] Date of Patent: Apr. 7, 1987

[54] INSULATION HOLDER

[76] Inventor: Charlie C. Weeks, Rte. 1 Box 595, Franklinville, N.C. 27248

[21] Appl. No.: 819,352

[22] Filed: Jan. 16, 1986

Related U.S. Application Data

[63] Continuation of Ser. No. 754,223, Jul. 12, 1985, abandoned, which is a continuation of Ser. No. 600,098, Apr. 13, 1984, abandoned.

[51] Int. Cl.[4] .............................................. B25B 1/00
[52] U.S. Cl. ................................... 269/156; 269/203
[58] Field of Search ......... 269/155, 156, 203, 296–301

[56] References Cited

U.S. PATENT DOCUMENTS 1,130,975  3/1915  Hopper .............................. 269/203
2,879,059  3/1959  Sandefur .............................. 269/156
3,385,592  5/1968  Hasell et al. ......................... 269/156
4,078,539  3/1978  Sprague .............................. 269/156

Primary Examiner—Frederick R. Schmidt
Assistant Examiner—Judy J. Hartman

[57] ABSTRACT

An insulator holder is provided herein which allows a lineman to service or repair porcelain insulators without being subjected to the hazzards of broken or cracked insulators. The insulator holder provides a plurality of jaws which converge toward a base whereby the insulator can be firmly held in place during maintenance. One embodiment of the device includes adjustable jaws which can be positioned according to the size of the insulator being repaired.

10 Claims, 4 Drawing Figures

INSULATION HOLDER

This is a continuation of application Ser. No. 06/754,223 filed July 12, 1985, now abandoned which was a continuation of application Ser. No. 06/600,098 filed Apr. 13, 1984, also now abandoned.

BACKGROUND OF THE INVENTION

1. Field of the Invention

This invention relates to an improved device for maintaining an electrical insulator in a convenient, stable position when the insulator is taken out of service for maintenance or repair.

2. Description of the Prior Art and Objectives of the Invention

Electrical power linemen are often faced with replacing porcelain insulators that are positioned on line support structures, usually high above the ground. The insulators have to be removed from the electrical lines and support poles and are taken to a service area or truck below for maintenance purposes. Such insulators vary in size, weight and composition but insulators formed from porcelain are extremely common. Usually a shoulder pin or other member is threaded into the insulator and when the insulator is serviced or exchanged the threaded member has to be often removed commonly referred to as "stripping" and the removal is generally done at the work area on the ground for convenience and safety purposes.

Insulators are somewhat difficult to handle because of their slick outer surface and because of their somewhat cylinderical shape and linemen often have to rely on the strength of their hands and arms to properly grip the insulator in order to remove the threaded shoulder pin which may be in tight engagement with the insulator. It is not unusual for insulators to be fractured after many years of usage and explosure whereby, upon being tightly gripped, they break or shatter lacerating the hands and arms of the workmen causing severe injuries.

With the disadvantages known of present methods to service and maintain electrical insulators, the present invention was devised and one of its objectives is to provide an insulator holder which will allow safe and easy insulator service.

Another objective of the present invention is to provide an insulator holder which has a series of jaws to firmly grip the insulator and maintain it in a stable position during the service operation.

It is still another objective of the present invention to provide an insulator holder having adjustable jaws to fit a variety of sizes and insulator shapes.

Still another objective of the present invention is to provide an insulator holder which can be removably attached to a truck body or other structure as required.

Other advantages and objectives of the invention will be realized by those skilled in the art in accordance with the detail description of the invention as set forth below.

SUMMARY OF THE INVENTION

The herebefore said and other objectives of the invention are accomplished by providing an insulator holder having a base to which is attached a series of jaws which converge toward said base whereby the insulator can be positioned therein and firmly held in place. The insulator can be urged towards the base along the converging jaws until it reaches a stable position whereupon a threaded sholder pin or other member can be turned or removed therefrom. The insulator holder as disclosed herein can have permanently positioned or adjustable jaws with the adjustable jaws being tightenable to a desired position to accomodate various insulator shapes or sizes.

DESCRIPTION OF THE PREFERRED EMBODIMENT

The preferred embodiment of the insulator holder comprises a base having a pair of retaining slots whereby the device can be removably attached to a support structure. The preferred embodiment includes a trio of jaws, two of which are horizontally aligned and which converge toward said base. A third jaw is vertically aligned between and below the horizontally aligned jaws. The pair of the horizontally aligned jaws converge towards the base allowing the insulator to be tightened into the holder as it is forced toward the base. The perferred embodiment is formed from one quarter ($\frac{1}{4}$) inch plate steel and is painted to prevent rust and corrosion. It is been found that the horizontal jaws can be adjustably positioned to have a frontal opening of approximately three and one half ($3\frac{1}{2}$) inches and converge toward the base to one and a half ($1\frac{1}{2}$) inches to accomodate most conventional insulators. A slight descent may be provided from the base or back to the front of the insulator holder with the vertical jaw and the top of the vertical jaw may be positioned slightly less than one (1) inch below the top of the horizontal jaws to accomodate conventional insulators.

DETAILED DESCRIPTION OF THE DRAWINGS

Figure 1:
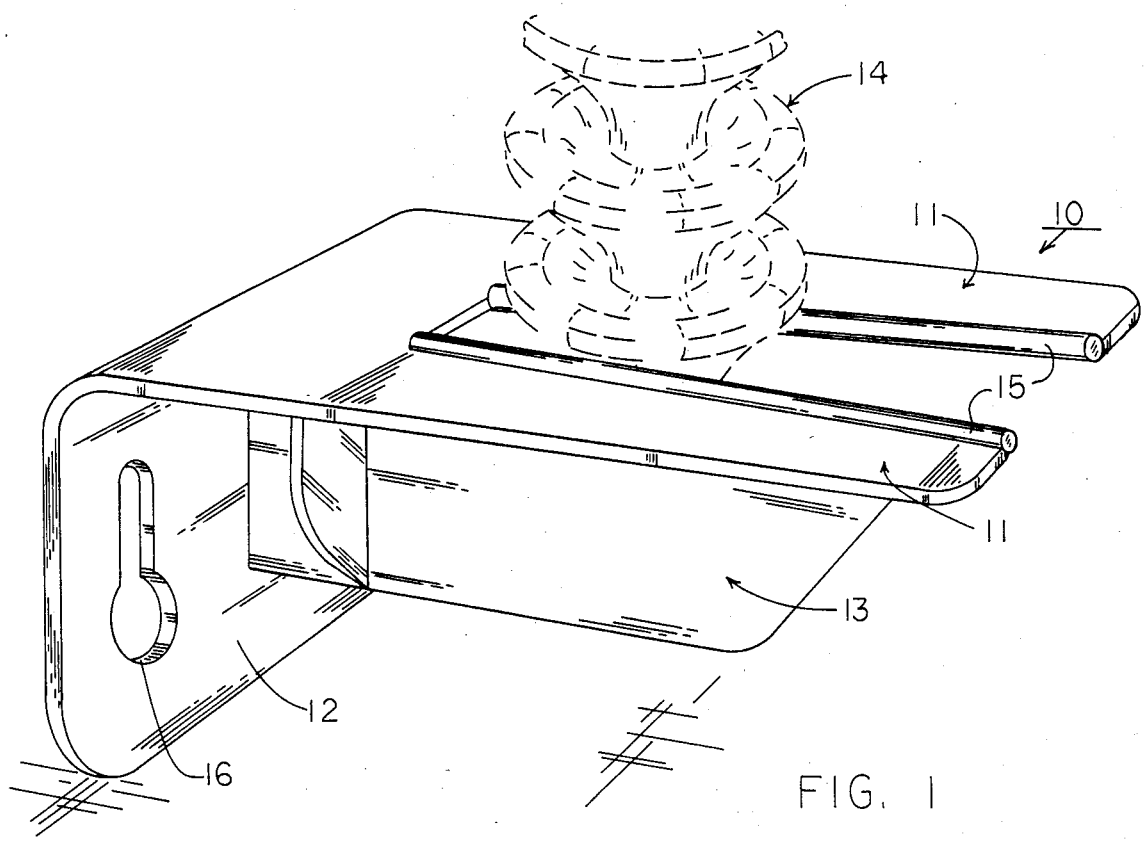
FIG. 1 demonstrates a perspective view of an insulator holder of the present invention having fixed jaws.

For a more complete understanding of the invention and its advantages, FIG. 1 demonstrates insulator holder 10 having a pair of fixed, horizontally aligned jaws 11 whereby their inner edges 15 converge toward base 12. Positioned between and immediately below horizontal jaws 11 is vertically aligned jaw 13 upon which insulator 14 rests, as shown in FIG. 1. Edges 15 of jaws 11 are rounded and smooth to allow easy insertion of insulator 14. Base 12 defines retaining slot 16 which is used to removably mount insulator holder 10 on a truck body or other support structure during its use.

Figure 2:
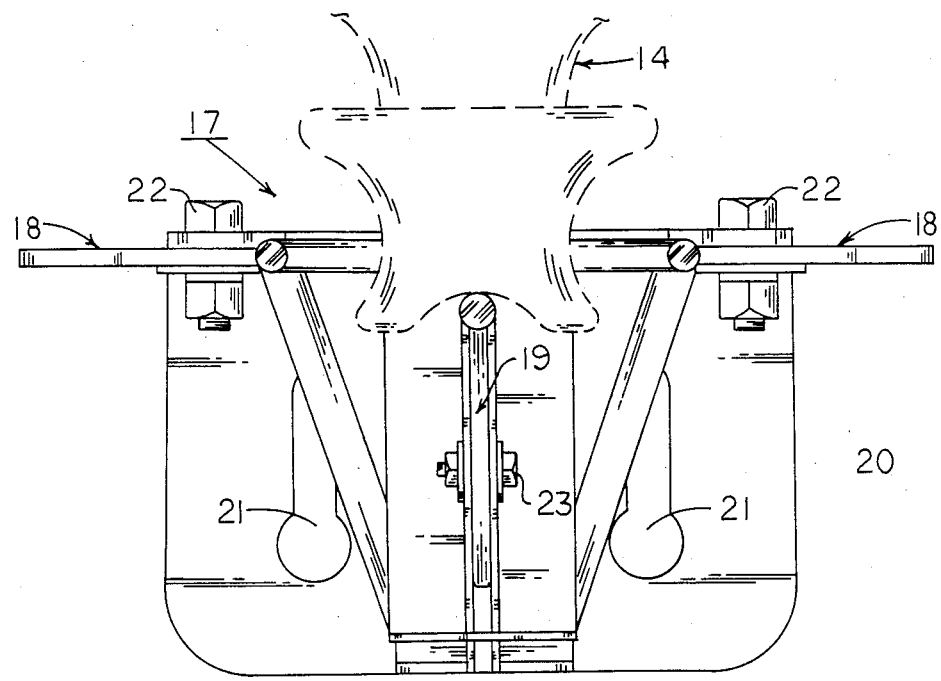
FIG. 2 demonstrates a front view of a second embodiment of the invention having adjustable jaws.

A second embodiment, insulator holder 17 as shown in FIG. 2 has a trio of adjustable jaws including horizontal jaws 18 and vertical jaw 19. Base 20 has a pair of retaining slots 21 for removably positioning holder 17 as required. During use, insulator 14 as shown in FIG. 2 is positioned on vertical jaw 19 and is urged inwardly until a firm fit therein is obtained.

Figure 3:
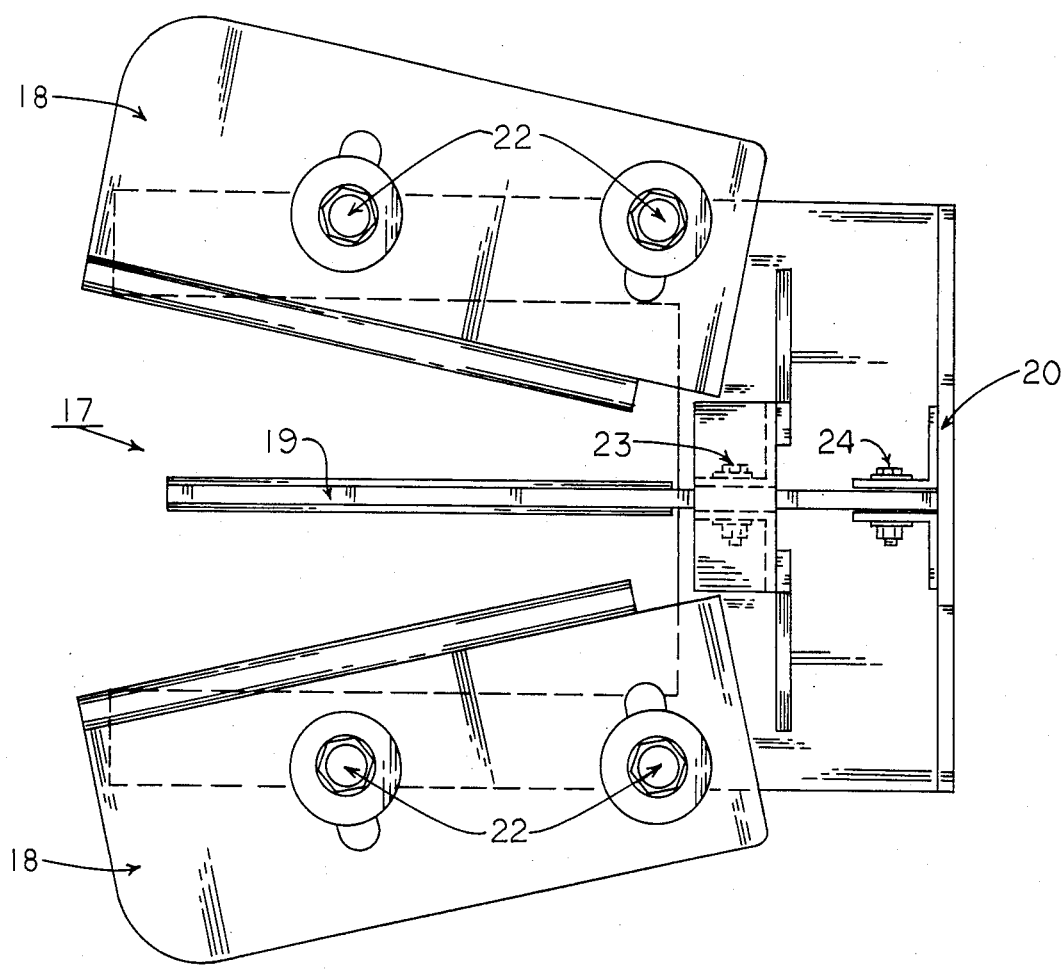
FIG. 3 is a bottom plan view of the insulator holder as shown in FIG. 2.

Adjusting members 22 as shown in FIG. 3 consist of a threaded bolt for adjusting the space and angle of convergence of horizontal jaws 18. As further shown in FIG. 3 adjusting members 23 and 24 allow for the movement of vertical jaw 19 as required depending upon the particular insulator configuration.

Figure 4:
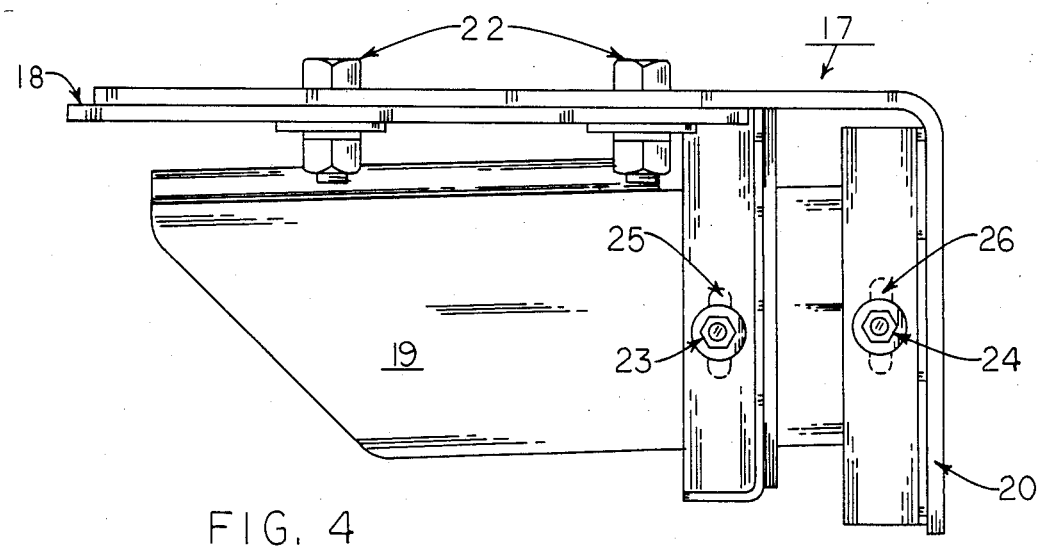
FIG. 4 is a side elevational view of the insulator holder as shown in FIG. 2.

In FIG. 4 vertical jaw 19 is adjustable in its distance from horizontal jaws 18 and is also angularly adjustable with adjusting means 23 and 24 as vertical jaw 19 includes adjusting slots 25 and 26.

In use, insulator holder 17 is affixed to a support structor such as the bumper of a truck by placing retaining slot 21 over suitably mounted boltheads or lugs for securement therewith. Next, an insulator which is to be serviced is placed on vertical jaw 19 and is urged inwardly until the convergence of horizontal jaws 18 prevent further inward movement. Service or maintenance can then be conveniently carried out and thereafter the insulator can be quickly removed from insulator holder 17 and another similarly dimensional insulator can be serviced. Of course, if an insulator of different dimensions is to be repaired, adjusting members 22 and if necessary 23 and 24 can be loosened, the respective jaws repositioned and tightened in place where upon the different size insulator can then be maintained.

At the completion of the day's usage, insulator holder 17 can be quickly removed from the boltheads or lugs and stored for future use.

Insulator holder 10 as shown in FIG. 1 can be less expensively manufactured than insulator holder 17 although it is more limited in its use due to the jaws not being adjustable.

Various modifications or changes can be made to the insulator holder of the present invention by those skilled in the art and the descriptions and illustrations presented herein are for explanatory purposes and are not intended to limit the scope of the invention.

I claim:

1. A device for temporarily holding an electrical insulator having converging jaws whereby the insulator can be urged along the jaws into tight engagement and subsequently removed therefrom without changing the positioning of the jaws comprising: a base, a plurality of jaws joined to said base, a pair of said jaws each having a relatively wide flat top surface and a narrow smooth inner edge, said pair of jaws positioned side-by-side in coplanar relation with said inner edges opposingly positioned for engaging the insulator between said edges, a third jaw, said third jaw positioned below and between said pair of jaws each of said jaws having a pair of adjusting members passing through said jaws, each of said adjusting members defining separate pivot points, whereby said jaws can be angularly adjusted therearound.

2. A device for holding an electrical insulator as claimed in claim 1 wherein one of said plurality of jaws is convergingly adjustable.

3. A device for holding an electrical insulator as claimed in claim 1 with said base defining a retaining slot.

4. A device for holding an electrical insulator as claimed in claim 1 wherein said pair of jaws each have edges which converge toward said base.

5. A device for holding an electrical insulator as claimed in claim 1 wherein said plurality of jaws consist of a trio of jaws.

6. A device for temporarily holding an electrical insulator as claimed in claim 1 wherein said jaws include inner edges which are arcuately shaped.

7. A device for temporarily holding an electrical insulator having converging jaws whereby the insulator can be urged along the jaws into tight engagement and subsequently removed therefrom without changing the positioning of the jaws comprising: a base, a trio of planar jaws, said jaws joined to said base each of said jaws having a pair of adjusting members passing through said jaws, each of said adjusting members defining separate pivot points, whereby said jaws can be angularly adjusted therearound, a coplanar pair of said jaws each having a relatively wide flat top surface with a narrow regular smooth inner edge, said pair of jaws positioned side-by-side with said inner edges opposing, said edges converging toward said base for engaging the insulator between said edges, said planar members being convergingly adjustable.

8. A device for holding an electrical insulator as claimed in claim 7 wherein said trio of jaws include a pair of horizontally aligned coplanar members and one vertically aligned planar member, said trio of planar members forming a polyhedral-shaped opening for receiving the insulator.

9. A device for holding an electrical insulator as claimed in claim 7 wherein one of said trio of jaws is adjustably joined to said base.

10. An insulator holder comprising: a relatively wide inverted L-shaped frame, the upper portion of said L-shaped frame defining a pair of side-by-side coplanar jaws with an opening therebetween, said coplanar jaws having a wide flat top surface with a narrow smooth inner edge, said jaws shaped with said inner edges opposingly converging inwardly toward the lower portion of said L-shaped frame, a lower jaw, said lower jaw mounted on the lower portion of said inverted L-shaped frame perpendicular to and between said coplanar jaws each of said jaws having a pair of adjusting members passing through said jaws, each of said adjusting members defining separate pivot points, whereby said jaws can be angularly adjusted therearound.

* * * * *